United States Patent
Edwards

(10) Patent No.: US 8,353,338 B2
(45) Date of Patent: Jan. 15, 2013

(54) WELL BORE CONTROL VALVE

(75) Inventor: Jeffrey Charles Edwards, Aberdeen (GB)

(73) Assignee: Enovate Systems Limited, Aberdeen (GB)

( * ) Notice: Subject to any disclaimer, the term of this patent is extended or adjusted under 35 U.S.C. 154(b) by 719 days.

(21) Appl. No.: 12/442,145

(22) PCT Filed: Sep. 20, 2007

(86) PCT No.: PCT/GB2007/003590
§ 371 (c)(1),
(2), (4) Date: Nov. 2, 2009

(87) PCT Pub. No.: WO2008/035091
PCT Pub. Date: Mar. 27, 2008

(65) Prior Publication Data
US 2010/0071913 A1   Mar. 25, 2010

(30) Foreign Application Priority Data
Sep. 21, 2006  (GB) .................................. 0618555.7

(51) Int. Cl.
*E21B 33/06* (2006.01)
*E21B 29/00* (2006.01)

(52) U.S. Cl. .......... 166/85.4; 166/55; 166/86.3; 251/1.3

(58) Field of Classification Search ............ 251/1.1–1.3; 166/55, 298, 85.4, 86.3
See application file for complete search history.

(56) References Cited

U.S. PATENT DOCUMENTS

| 2,231,613 | A | | 2/1941 | Burke |
| 2,986,367 | A | | 5/1961 | Le Rouax |
| 3,561,526 | A | * | 2/1971 | Williams et al. ................. 166/55 |
| 4,081,027 | A | * | 3/1978 | Nguyen ........................... 116/55 |
| 4,612,983 | A | | 9/1986 | Karr, Jr. |
| 5,515,916 | A | * | 5/1996 | Haley ............................... 166/55 |
| 6,357,529 | B1 | * | 3/2002 | Kent et al. ..................... 166/344 |
| 2008/0135791 | A1 | * | 6/2008 | Juda et al. ...................... 251/1.3 |
| 2009/0050828 | A1 | * | 2/2009 | Edwards ........................ 251/1.3 |

FOREIGN PATENT DOCUMENTS

| GB | 2 352 494 A | 1/2001 |
| GB | 2 417 260 A | 2/2006 |
| WO | WO 03/014604 A2 | 2/2003 |
| WO | WO 2006/040590 A1 | 4/2006 |

* cited by examiner

*Primary Examiner* — Giovanna Wright
(74) *Attorney, Agent, or Firm* — Tarolli, Sundheim, Covell & Tummino LLP

(57) ABSTRACT

The well bore control valve comprises a housing (12) defining a throughbore (14), the throughbore adapted to receive a first tubular. The valve further comprises first (18) and second gates (20) located within the housing, the gates being movable in different directions transverse to the throughbore between the throughbore open position and the throughbore closed position. Movement of the gates from the throughbore open position to the throughbore closed position, in use, shares a tubular located between the gates. The valve also comprises a first seal seat (22) performing a seal of one of the gates in the throughbore closed position to seal the throughbore. In one embodiment, the gates are axially movable with respect to the throughbore.

35 Claims, 4 Drawing Sheets

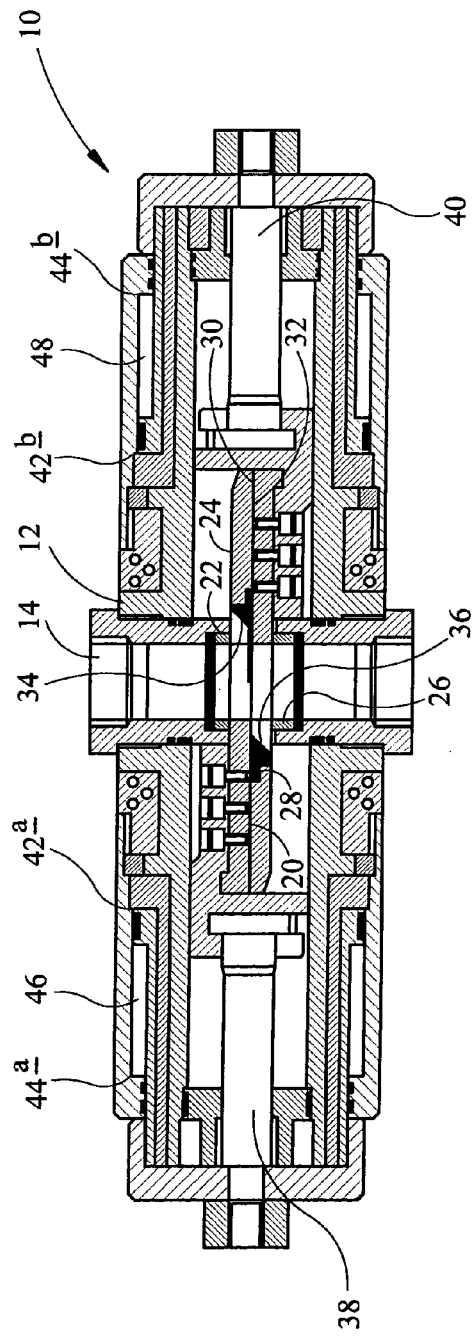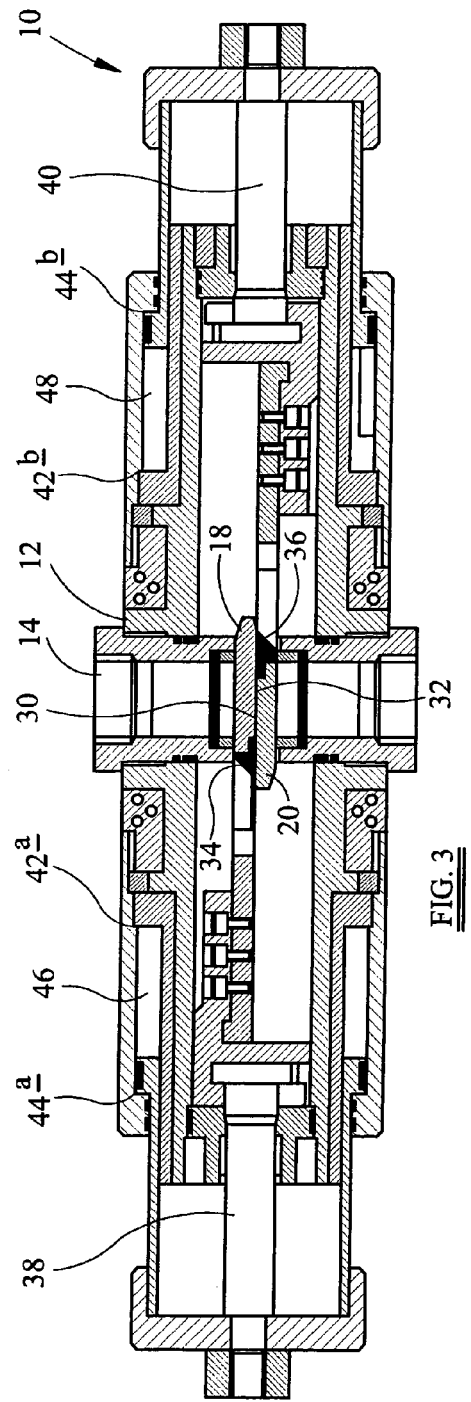

WELL BORE CONTROL VALVE

FIELD OF THE INVENTION

The present invention relates to a valve for sealing a throughbore, particularly but not exclusively for sealing a well bore through which a tubular, such as a workover/drilling conduit or intervention tooling passes.

BACKGROUND OF THE INVENTION

For the protection of personnel and the environment, oil installations are provided with one or more well bore control devices, such as a riser control device or a blow out preventer, for sealing the well bore.

Some well bore control devices have cutting rams mounted perpendicular to a vertical throughbore. The rams can be activated to sever a tubular disposed in the wellbore and seal the well bore. The cutting rams move through a horizontal plane and are often driven by in-line pistons. These devices have drawbacks however. For example, sealing is generally achieved using elastomeric seals, the limitations of which are being exposed as more aggressive, high-temperature high-pressure, wells are developed.

Improved sealing can be achieved using valves to seal the throughbore, however currently available valves can only successfully cut through a limited range of conduits.

SUMMARY OF THE INVENTION

It is an object of the present invention to obviate or mitigate at least one of the aforementioned disadvantages.

According to a first aspect of the present invention there is provided a well bore control valve comprising:

a housing defining a throughbore, the throughbore adapted to receive a tubular;

first and second gates located within the housing, the gates being moveable in different directions transverse to the throughbore between a throughbore open position and a throughbore closed position, movement of the gates from the throughbore open position to the throughbore closed position, in use, shearing a tubular located between the gates; and a first seal seat for forming a seal with one of the gates in the throughbore closed position to seal the throughbore.

In the event of an emergency, a well bore control valve according to an embodiment of the present invention will shear the tubular, for example a workover/drilling conduit or intervention tooling, to close the throughbore, a seal being formed between the first gate and the first seal seat. Providing two gates provides an improved cutting performance of the tubular.

Preferably, the valve further comprises a second seal seat for forming a seal with the other of the gates. Provision of a second seal seat provides dual independent sealed barriers adapted to contain well pressure.

Preferably, in the throughbore closed position each gate extends across the throughbore.

Preferably, each gate defines a shearing portion and a sealing portion.

Preferably, the shearing portion is different to the sealing portion.

Preferably, each gate defines a plurality of faces.

Preferably, the shearing portion is defined by one of said gate faces and the sealing portion is defined by a different one of said gate faces.

Preferably, the shearing face is opposite the sealing face. Providing each gate with separate shearing and sealing faces reduces the likelihood of damage to the sealing face as the tubular is sheared.

Preferably, in the throughbore closed position, the shearing faces are adjacent.

Preferably, the gates are axially restrained to each other.

Preferably, the gates are axially moveable with respect to the throughbore. Axial movement of the gates permits the gates to move into a sealing engagement with a/one of the seal seats under the action of an external force, such as an applied pressure.

Preferably, the first seal seat is axially moveable with respect to the throughbore towards the gates.

Preferably, the second seal seat is axially moveable with respect to the throughbore towards the gates. Axial movement of one or both of the seats permits the seal seats to move into a sealing engagement with the gates under the action of an external force, such as an applied pressure. Once the control valve is actuated, a pressure differential may exist across the closed gates and if, for example, the pressure is higher below the closed gates than above the closed gates, the pressure differential will press the upper gate on to the upper seat and the lower seat onto the lower gate, thereby improving the seal.

Preferably, the first and/or second seal seats is/are biased towards the gates.

Preferably, the/each seal seat is biased towards the gates by means of a conical washer.

Alternatively, the/each seal seat is biased towards the gates by at least one spring Preferably, each gate comprises a seal seat engaging portion.

Preferably, the seal seat engaging portions comprise metal.

Preferably, the seal seat engaging portions comprise Inconel.

Preferably, the seal seats comprise metal. A metal-to-metal sealing arrangement provides the desired level of chemical and temperature resistance and mechanical integrity.

Preferably, the seal seats and/or the seal seat engaging portions are hard faced.

Preferably, the seal seats and/or the seal seat engaging portions are hard faced with tungsten carbide.

Preferably, the valve further comprises actuation means to move the gates from the throughbore open position to the throughbore closed position.

Preferably, the actuation means pulls the gates from the throughbore open position to the throughbore closed position. Pulling the gates closed ensures no potential buckling forces are induced during cutting of the tubular, therefore ensuring the gates remain in a fixed axial relationship, thereby increasing the shear forces between the gates and increasing the cutting force generated. A further advantage of this arrangement is that internal well bore pressure assists closure of the rams.

Preferably, the actuation means is hydraulically powered.

Preferably, each gate comprises a cutting portion.

Preferably, each cutting portion is hardened metal.

Preferably, each cutting portion comprises an element removably attachable to its respective gate. This means the cutting elements are replaceable to maximise cutting efficiency.

Preferably, each cutting portion defines a cutting edge.

Preferably, each cutting edge is V-shaped.

Preferably, the gates are moveable in opposite directions.

According to a second aspect of the present invention there is provided a method of sealing a well bore, the method comprising:

actuating first and second gates in different directions transverse to a throughbore defined by a valve housing; and engaging the one of the gates with a first seal seat.

Preferably, the method comprises the additional step of engaging the other of the gates with a second seal seat.

BRIEF DESCRIPTION OF THE DRAWINGS

The present invention will now be described, by way of example, with reference to the accompanying diagrams in which:

FIG. 2 is a longitudinal section view of the well bore control valve of FIG. 1 shown in the throughbore open position;

FIG. 3 is a longitudinal section view of the well bore control valve of FIG. 1 shown in a throughbore closed position;

DESCRIPTION OF EXAMPLE EMBODIMENTS

Figure 1:
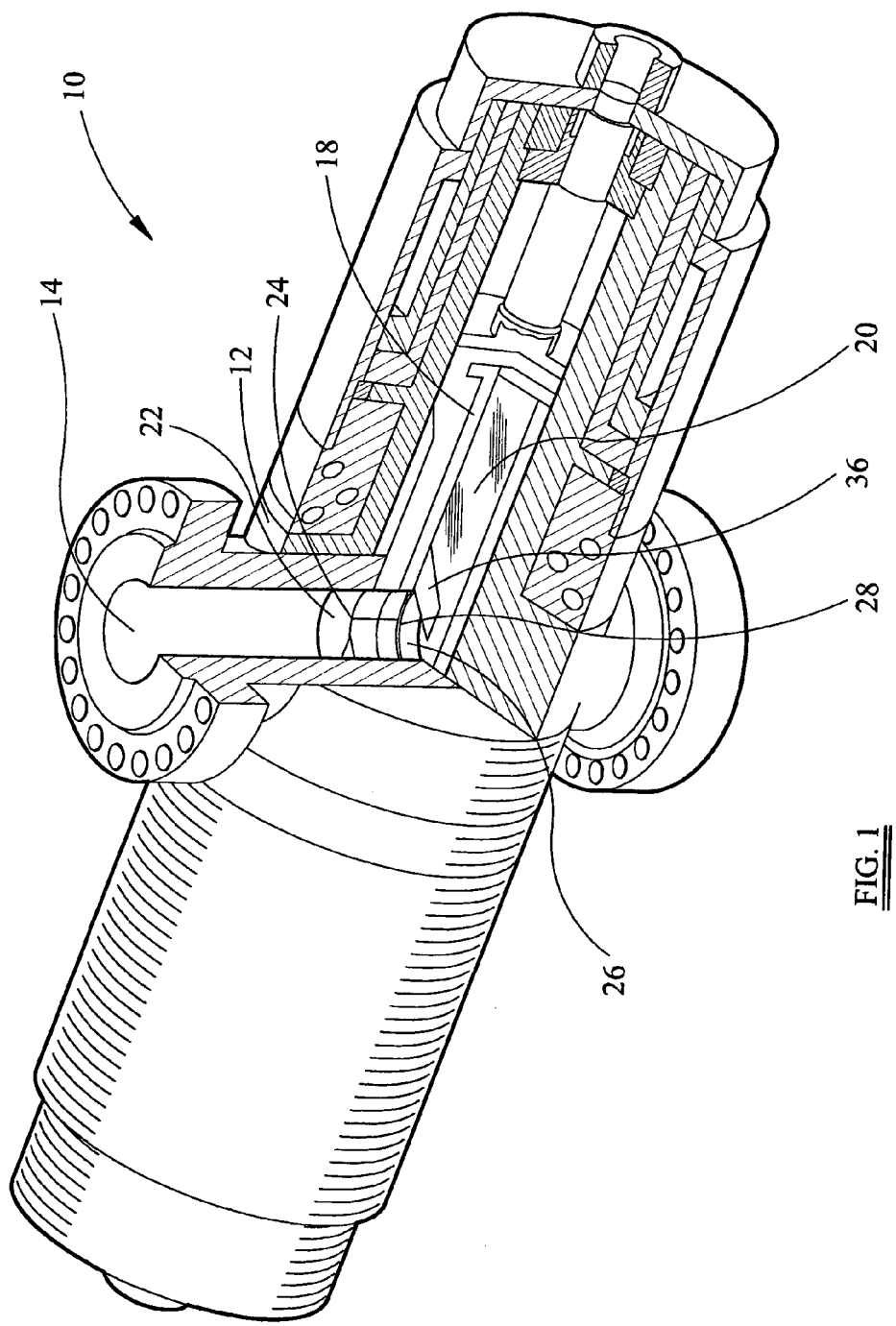
FIG. 1 is a partially cutaway perspective view of a well bore control valve according to an embodiment of the present invention shown in a throughbore open position.

Referring firstly to FIG. 1, there is shown partially cutaway perspective view of a well bore control valve, generally indicated by reference numeral 10, according to an embodiment of the present invention shown in a throughbore open position, and FIG. 2, a longitudinal section view of the well bore control valve 10, also shown in the throughbore open position. The well bore control valve 10 comprises a housing 12 defining a throughbore 14, the throughbore 14 adapted to receive a workover conduit (not shown).

The well bore control valve 10 further comprises a first gate 18 and a second gate 20. The gates 18,20 are moveable between a throughbore open position, shown in FIGS. 1 and 2, and a throughbore closed position, shown in FIG. 3, a longitudinal section view of the well bore control valve 10 of FIG. 1 in the throughbore closed position. The gates 18,20 are made from corrosion resistant Inconel and are hard faced with tungsten carbide.

Referring particularly to FIG. 2, the well bore control valve 10 further comprises a first seal seat 22 located adjacent an upper sealing face 24 of the first gate 18, and a second seal seat 26 located adjacent a lower sealing face 28 of the second gate 20. The first and second seal seats 22,26 are also made from corrosion resistant Inconel and are hard faced with tungsten carbide.

The well bore control valve 10 is arranged to permit the first and second gates 18,20 to move axially with respect to the throughbore 14, and the second seal seat 26 to move axially towards the second gate 20. The purpose of this movement will be discussed in due course.

On the opposite side of the first gate 18 from its sealing face 24 is a first gate shearing face 30. Similarly, on the opposite side of the second gate 20 from its sealing face 28 is a second gate shearing face 32.

Figure 4:
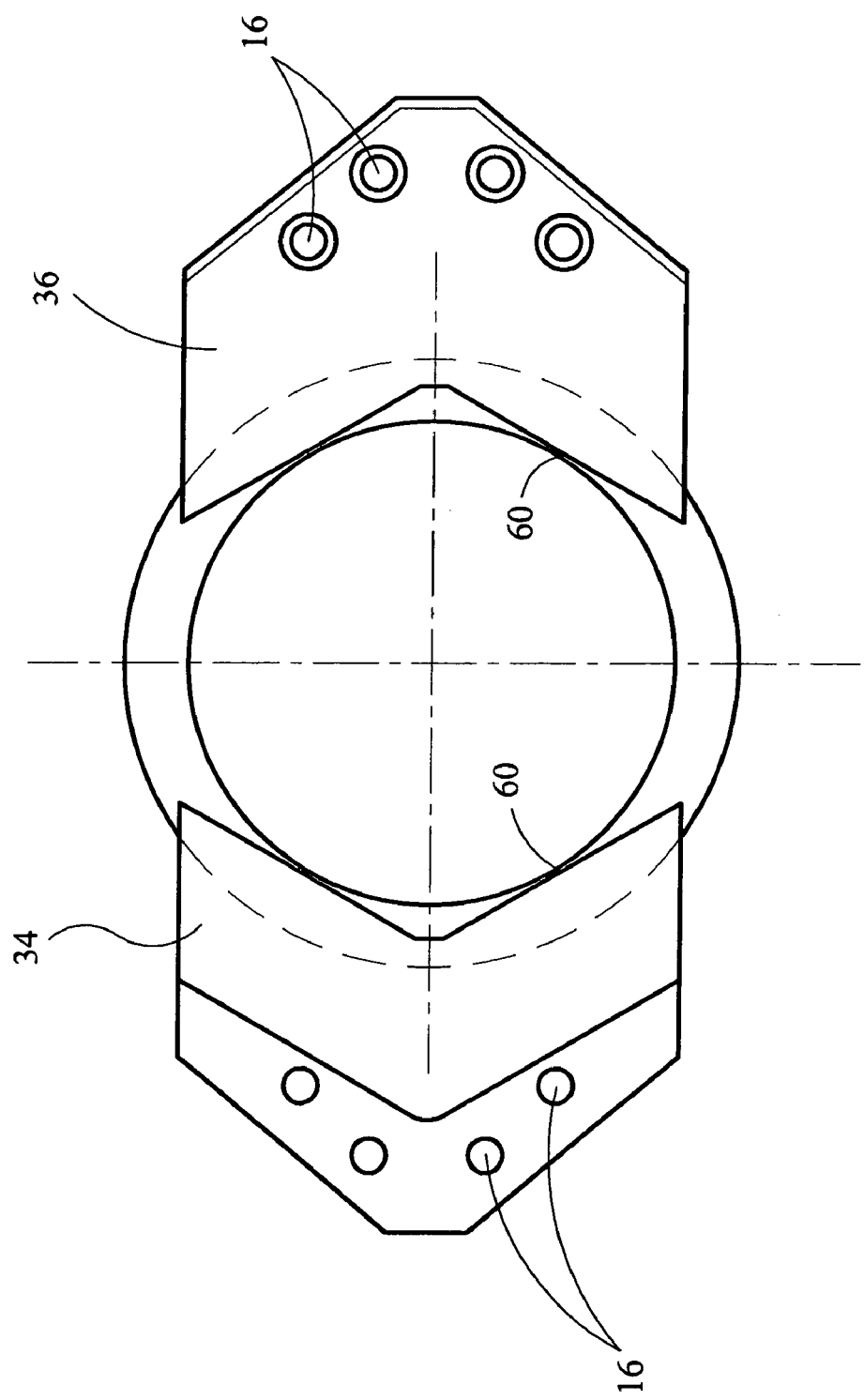
FIG. 4 is a plan view of the cutting elements of FIG. 1.

Each gate 18,20 further comprises a cutting element 34,36 to assist the gates 18,20 in shearing through the workover conduit. Each cutting element 34,36 is attached to its respective gate 18,20 by four screws 16. The cutting elements 34,36 are best seen in FIG. 4, a plan view of the cutting elements of FIG. 1. As can be seen from FIG. 4, the cutting elements 34,36 define a V-shaped cutting edge 60. When initiated, each V-shaped cutting edge 60 engages the tubular to be cut in two places and acts to cut the tubular with a shearing action.

Referring back to FIGS. 2 and 3, the gates 18,20 are moved from the throughbore open position to the throughbore closed position by first and second hydraulic actuators 38,40. The first hydraulic actuator 38 is associated with the first gate 18 and the second hydraulic actuator 40 is associated with the second gate 20. The housing 12 defines a pair of hydraulic fluid inlet ports 42*a*,42*b* and a pair of hydraulic fluid outlet ports 44*a*,44*b* for the insertion and removal of hydraulic fluid from first and second hydraulic chambers 46,48 associated with the first and second hydraulic actuators 38,40 respectively.

To move the first and second gates 18,20 from the throughbore open position shown in FIG. 2, to the throughbore closed position in FIG. 3, hydraulic fluid is injected through the inlet ports 42*a*,42*b*, thereby moving the hydraulic actuators 38,40 away from the throughbore 14 and moving the first and second gates 18,20 to the throughbore closed position, as shown in FIG. 3. In moving to the throughbore closed position the gates 18,20 will shear through the workover conduit disposed in the throughbore 14.

Figure 5:
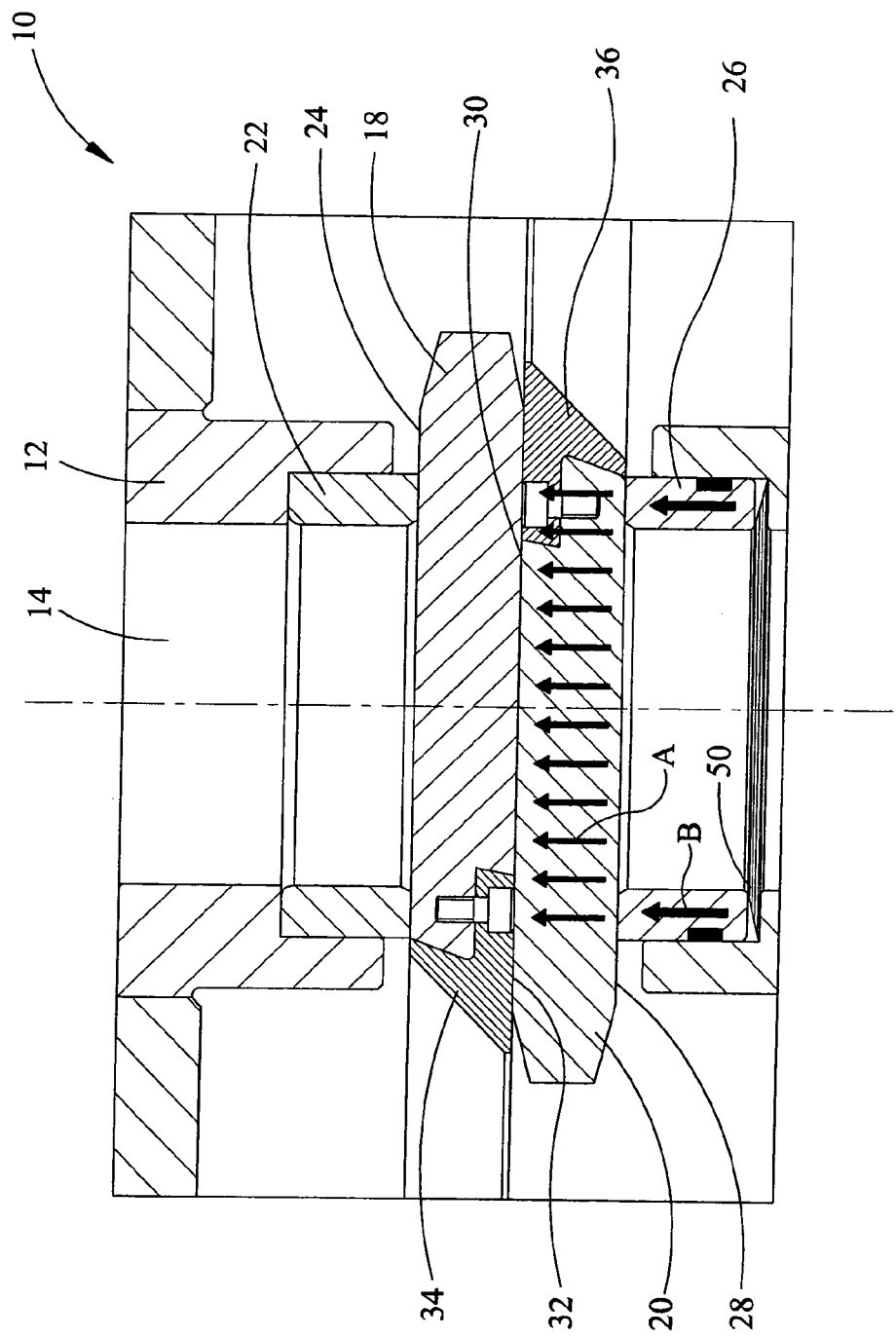
FIG. 5 is an enlarged section view of the first and second seal seats and part of the housing and gates of the well bore control valve of FIG. 1 in the throughbore closed position.

Closing the throughbore 14 results in an increase in pressure, in this case, below the gates 18,20. This increase in pressure is utilised to create a double seal as will now be described with reference to FIG. 5, an enlarged section view of the first and second seal seats 22,26 and part of the housing 12 and gates 18,20 of FIG. 1 in the throughbore closed position.

As the pressure increases below the gates 18,20, the gates 18,20 move in the direction of arrows "A" towards the first seal seat 22. A first seal is formed when the first gate sealing face 24 engages the first seal seat 22. Under the influence of the pressure differential, the second seal seat 26 moves axially towards the gates 18,20, and indeed a conical spring 50 is provided to bias the second seal seat 26 in to engagement with the second gate sealing face 28 in the direction of arrows "B". The action of the conical spring 50 and the pressure differential across the gates 18,20 presses the second seal seat 26 into engagement with the second gate 20, forming a second seal. Therefore the well bore control valve 10 provides two independent metal-to-metal seals.

Various modifications and improvements may be made to the embodiment hereinbefore described without departing from the scope of the invention. For example, it will be understood that both seal seats may be moveable towards the gates. This arrangement is assists in forming a dual seal in a situation where a pressure differential resulting in a higher pressure above the gates exists.

The invention claimed is:

1. A well bore control valve comprising:
   a housing defining a throughbore, the throughbore adapted to receive a tubular;
   first and second gates located within the housing, the gates being moveable in different directions transverse to the throughbore between a throughbore open position and a throughbore closed position, movement of the gates from the throughbore open position to the throughbore closed position, in use, shearing a tubular located between the gates; and
   a first seal seat for forming a seal with one of the gates in the throughbore closed position to seal the throughbore,
   wherein the gates are axially moveable with respect to the throughbore.

2. A well bore control valve of claim 1, wherein the valve further comprises a second seal seat for forming a seal with the other of the gates.

3. A well bore control valve of claim 2, wherein the second seal seat is axially moveable with respect to the throughbore towards the gates.

4. A well bore control valve of claim 2, wherein the second seal seat is biased towards the gates.

5. A well bore control valve of claim 4, wherein each seal seat is biased towards the gates by means of a conical washer.

6. A well bore control valve of claim 4, wherein each seal seat is biased towards the gates by at least one spring.

7. A well bore control valve of claim 2, wherein each seal seat comprises metal.

8. A well bore control valve of claim 7, wherein each seal seat is hard faced.

9. A well bore control valve of claim 8, wherein each seal seat is hard faced with tungsten carbide.

10. A well bore control valve of claim 1, wherein in the throughbore closed position each gate extends across the throughbore.

11. A well bore control valve of claim 1, wherein each gate defines a shearing portion and a sealing portion.

12. A well bore control valve of claim 11, wherein the shearing portion is different from the sealing portion.

13. A well bore control valve of claim 1, wherein each gate defines a plurality of faces.

14. A well bore control valve of claim 1, wherein each gate defines a shearing portion and a sealing portion and each gate defines a plurality of faces, the shearing portion being defined by one of said gate faces and the sealing portion being defined by a different one of said gate faces.

15. A well bore control valve of claim 1, wherein each gate defines a shearing portion and a sealing portion and each gate defines a plurality of faces, the shearing portion being defined by one of said gate faces and the sealing portion being defined by a different one of said gate faces and the shearing face is opposite the sealing face.

16. A well bore control valve of claim 1, wherein each gate defines a shearing portion and a sealing portion and each gate defines a plurality of faces, the shearing portion being defined by one of said gate faces and the sealing portion being defined by a different one of said gate faces and the shearing face is opposite the sealing face, and wherein in the throughbore closed position, the shearing faces are adjacent.

17. A well bore control valve of claim 1, wherein the gates are axially restrained to each other.

18. A well bore control valve of claim 1, wherein the first seal seat is axially moveable with respect to the throughbore towards the gates.

19. A well bore control valve of claim 1, wherein the first seal seats is biased towards the gates.

20. A well bore control valve of claim 19, wherein the seal seat is biased towards the gates by means of a conical washer.

21. A well bore control valve of claim 19, wherein the seal seat is biased towards the gates by at least one spring.

22. A well bore control valve of claim 1, wherein each gate comprises a seal seat engaging portion.

23. A well bore control valve of claim 22, wherein the seal seat engaging portions comprise metal.

24. A well bore control valve of claim 22, wherein the seal seat engaging portions comprise Inconel.

25. A well bore control valve of claim 1, wherein the seal seat comprises metal.

26. A well bore control valve of claim 1, wherein the seal seat and/or seal seat engaging portions are hard faced.

27. A well bore control valve of claim 26, wherein the seal seat and/or the seal seat engaging portions are hard faced with tungsten carbide.

28. A well bore control valve of claim 1, wherein each gate comprises a cutting portion.

29. A well bore control valve of claim 28, wherein each cutting portion is hardened metal.

30. A well bore control valve of claim 28, wherein each cutting portion comprises an element removably attachable to its respective gate.

31. A well bore control valve of claim 28, wherein each cutting portion defines a cutting edge.

32. A well bore control valve of claim 28, wherein each cutting portion defines a V-shaped cutting edge.

33. A well bore control valve of claim 1, wherein the gates are moveable in opposite directions.

34. A well bore control valve of claim comprising:
 a housing defining a throughbore, the throughbore adapted to receive a tubular;
 first and second gates located within the housing, the gates being moveable in different directions transverse to the throughbore between a throughbore open position and a throughbore closed position, movement of the gates from the throughbore open position to the throughbore closed position, in use, shearing a tubular located between the gates; and
 a first seal seat for forming a seal with one of the gates in the throughbore closed position to seal the throughbore,
 wherein the valve further comprises actuation means to move the gates from the throughbore open position to the throughbore closed position, and
 wherein the actuation means pulls the gates from the throughbore open position to the throughbore closed position.

35. A well bore control valve of claim 34, wherein the actuation means is hydraulically powered.

* * * * *